(12) United States Patent
Kajita

(10) Patent No.: US 7,325,396 B2
(45) Date of Patent: Feb. 5, 2008

(54) EXHAUST MANIFOLD

(75) Inventor: Takuya Kajita, Aichi Pref (JP)

(73) Assignee: Aisin Takaoka Co., Ltd., Toyota (JP)

( * ) Notice: Subject to any disclaimer, the term of this patent is extended or adjusted under 35 U.S.C. 154(b) by 157 days.

(21) Appl. No.: 11/353,982

(22) Filed: Feb. 15, 2006

(65) Prior Publication Data

US 2007/0039319 A1    Feb. 22, 2007

(30) Foreign Application Priority Data

Feb. 17, 2005    (JP) ............................. 2005-040172

(51) Int. Cl.
*F01N 7/10* (2006.01)

(52) U.S. Cl. .................. 60/323; 60/287; 60/288; 60/292; 60/305; 60/313; 60/324

(58) Field of Classification Search .......... 60/287, 60/288, 291, 292, 302, 305, 312, 313, 323, 60/324

See application file for complete search history.

(56) References Cited

U.S. PATENT DOCUMENTS

| | | | |
|---|---|---|---|
| 5,956,949 A * | 9/1999 | Mayer et al. ............ | 60/301 |
| 6,223,527 B1 * | 5/2001 | Philips .................... | 60/288 |
| 6,378,298 B2 * | 4/2002 | Harima et al. ........... | 60/288 |
| 6,487,854 B2 * | 12/2002 | Maus ...................... | 60/324 |
| 6,655,134 B2 * | 12/2003 | Nakayasu et al. ........ | 60/324 |

FOREIGN PATENT DOCUMENTS

| | | |
|---|---|---|
| DE | 41 29 216 A1 | 3/1993 |
| DE | 195 00 996 A1 | 7/1996 |
| EP | 0 837 227 A1 | 4/1998 |
| EP | 1 605 145 A1 | 12/2005 |
| JP | 7-22016 | 4/1995 |
| JP | 08189344 A * | 7/1996 ............. 60/323 |

* cited by examiner

*Primary Examiner*—Binh Q. Tran
(74) *Attorney, Agent, or Firm*—Young & Thompson

(57) ABSTRACT

An exhaust manifold includes an open/close valve that switches between either closing or opening the exhaust path of a collection section, and switches the exhaust path of the exhaust gas between passing through or not passing through a bypass path containing an upstream catalyst. There is a partition wall structure in a pipe-mounting member so that when the valve is closed such that the exhaust gas during cold start is led to the upstream catalyst, the exhaust paths for each of the branch pipes on the upstream side of the valve inside a collection section are independent from one another. When the valve is closed, the downstream side of each of the branch pipes is not continuous inside the collection section, so the flow of air is prevented in this section, and exhaust interference and loss of exhaust heat are reduced.

16 Claims, 3 Drawing Sheets

EXHAUST MANIFOLD

FIELD OF THE INVENTION

This invention relates to an exhaust manifold, and more specifically to the installation and construction of cylinder branch pipes and a collection section that collects each of the branch pipes into one.

BACKGROUND OF THE INVENTION

In the exhaust system of an engine, for example in the case of a 4-cylinder engine, there is an exhaust manifold that brings the four branches corresponding to each cylinder into one. The exhaust manifold comprises: a head flange section that has an opening corresponding to the exhaust port of each cylinder; four branches that are connected to each of the openings on the flange section; and a collection section that collects the downstream side of all of the branches into one and directs them to the catalyst in order to clean the exhaust gas (for example, refer to Document 1).

Also, as disclosed in aforementioned Document 1, in some recent exhaust manifolds there is an open/close valve that switches between either closing or opening the exhaust pathway of the collection section. In this kind of exhaust manifold there is a bypass path between the upstream end section of each branch and the middle section of a main catalyst (downstream catalyst) that is located in the open/close valve and downstream of that open/close valve, and there is a pre-catalyst (upstream (front) catalyst) located inside that bypass path.

Also, during a cold startup, the open/close valve is in the closed state, and exhaust gas flows from the bypass path, through the pre-catalyst and then to the main catalyst. In this way, the pre-catalyst reaches a suitable activation temperature earlier than the main catalyst, and thus purification of the exhaust gas can be performed effectively. On the other hand, as the main catalyst rises to a suitable catalyst activation temperature, the open/close valve switches to the open state, and the exhaust gas is switched-over such that it flows directly to the main catalyst. In other words, when the exhaust gas is discharged by way of the bypass path (via pre-catalyst), the exhaust resistance is large and affects the engine output. Therefore, after the main catalyst has risen to a suitable activation temperature, the open/close value opens and switches-over the flow path of the exhaust gas to the main path (main catalyst) that has a low exhaust resistance.

SUMMARY OF THE INVENTION

However, in the aforementioned Document 1, in the collection section that collects together (merges) all of the branches, the exhaust paths become one (i.e., communicate with each other) on the upstream side of the open/close valve. Therefore, during the cold startup, even though the open/close valve is in the closed state, each of the branches is in a state of being continuous with each other in the space inside the collection section on the upstream of the open/close valve. In this way, the flow of air between the branches and the collection section becomes active.

Therefore, due to the continuity in the collection section of each of the branches, engine performance decreases because the exhaust interference to other cylinders becomes large due to the exhaust pulsation. Moreover, since the airflow between each of the branches becomes active, it will result that all of the air in this space is warmed by the exhaust gas. Therefore, the exhaust heat of the exhaust gas is absorbed (or dissipated), so the amount of heat for warming up the pre-catalyst is reduced. Therefore, it results in a gradual rise in the temperature of the pre-catalyst, and time is required for the pre-catalyst to reach a suitable activation temperature.

Thus, there is much to be desired in the art.

[Document 1] Japanese Utility Model Kokai Publication No. JP07-22016U

It is a main object of the present invention to provide an exhaust manifold that comprises an open/close valve that switches between either closing or opening the exhaust path of a collection section, and switches the exhaust path of the exhaust gas between passing through or not passing through a bypass path containing a upstream (front) catalyst; and that is capable of improving flow of exhaust gas when the open/close valve is completely closed, and reducing exhaust interference and loss of exhaust heat.

Further subjects of the present invention will become apparent in the entire disclosure including the claims.

According to a first aspect of the present invention, there is provided an exhaust manifold comprising: branch pipes that correspond to each cylinder of a multi-cylinder internal-combustion engine; a collection section that collects together end sections on the downstream side of the branch pipes and leads them to a downstream (rear) catalyst; a bypass path for joining the upstream side of the collection section with the downstream side of the collection section, and causes an upstream (front) catalyst to intervene midstream; and an open/close valve that closes the exhaust path inside the collection section and leads exhaust gas from an internal-combustion engine to the side of the upstream catalyst, while on the other hand, by opening that exhaust path, leads the exhaust gas to the side of the downstream catalyst (termed "basic structure" hereinafter). When the open/close valve is closed, a path system is established such that exhaust paths for each of the collected branch pipes are independent from one another on the upstream side of the open/close valve inside the collection section.

With the first aspect of the present invention, when the open/close valve is closed during a cold start so that the exhaust gas is led to the side of the upstream (front) catalyst, the exhaust paths on the upstream side of the open/close valve for each of the collected branch pipes are independent from each other. Therefore, since the downstream sides of the branch pipes are not continuous (i.e., not communicate with each other) inside the collection section, the flow of air in this section is prevented. By doing this, the exhaust interference in other cylinders due to exhaust pulsation in the collection section does not occur, so a drop in the engine performance is suppressed. Also, since the air flow inside the exhaust path from the downstream side of the bypass path in the independent exhaust paths for each of the branch pipes to the open/close valve is small, it is not necessary to actively warm all of the air in this section, and thus it is possible to keep the loss of exhaust heat of the exhaust gas to a minimum. Therefore, the upstream (front) catalyst is warmed early within a shorter period of time.

According to a second aspect of the present invention, an exhaust manifold of the basic structure further comprises a partition wall structure that separates the exhaust paths for each of the collected branch pipes on the upstream side of the open/close valve inside the collection section, when the open/close valve is closed.

With the second aspect of the present invention, when the open/close valve is closed during a cold start so that the exhaust gas is led to the side of the upstream (front) catalyst, by having a partition wall structure, the exhaust paths for each of the collected branch pipes on the upstream side of the open/close valve inside the collection section become independent from each other. Even by doing this, the same effect as in the first aspect is obtained.

According to a third aspect of the present invention, the external shape of at least a portion of the collection section that collects the branch pipes is circular shaped; and the cross-sectional shape of the exhaust paths for each of the branch pipes inside the collection section is fan shaped and spaced by a uniform angle that corresponds to the number of branch pipes that are collected.

With the third aspect of the present invention, the external shape of at least the portion of the collection section that collects the branch pipes is circular shaped, and the cross-sectional shape of the exhaust paths for each of the branch pipes inside the collection section is fan shaped and spaced at an angle that corresponds to the number of branch pipes that are collected. In other words, the cross-sectional area of the exhaust paths for each of the branch pipes inside the collection section use up as much space as possible, while at the same time make it possible to make the external shape of the portion of the collection section that collects the branch pipes as small as possible, and thus makes it possible to make the collection section more compact.

According to a fourth aspect of the present invention, the collection section comprises a pipe-mounting member that has portholes corresponding to each of the branch pipes such that the end sections on the downstream side of each of the collected branch pipes are inserted and mounted in the respective portholes, and each of the portholes on the side opposite the branch pipes is opened or closed by the open/close valve.

With the fourth aspect of the present invention, the pipe-mounting member has portholes that correspond to each of the branch pipes, and the end sections on the downstream side of each of the collected branch pipes are inserted and mounted in the respective portholes. The open/close valve opens or closes the portholes on the side opposite the branch pipes in the pipe-mounting member. In other words, by simply using this kind of pipe-mounting member, mounting of the branch pipes becomes easier, and it becomes easy to switch-over to a state of the independent paths for each of the branch pipes when the open/close valve is closed.

According to a fifth aspect of the present invention, when the external shape of the end sections on the downstream side of the branch pipes is different from the shape of the portholes, the external shape of the end sections on the downstream side of the branch pipes is deformed to match the shape of the portholes such that they can be inserted into the portholes.

With the fifth aspect of the present invention, when the external shape of the end sections on the downstream side of the branch pipes is different from the shape of the portholes of the pipe-mounting member, the external shape of the end sections on the downstream side of the branch pipes is deformed to match the shape of the portholes such that they can be inserted into the portholes. Therefore, it is possible to decrease the size of the gap between the inner wall surface that forms the portholes and the branch pipes, and thus it is possible to easily and surely mount the branch pipes in the pipe-mounting member.

According to a sixth aspect of the present invention, the open/close valve has a valve disc located on the tip-end section of an arm that is capable of closing the exhaust path inside the collection section, and by rotatable pivoting the base-end section of the arm, closes or opens the exhaust paths inside the collection section.

With the sixth aspect of the present invention, the open/close valve is such that the valve disc on the tip-end section of the arm closes or opens the exhaust path inside the collection section by rotating the base-end section of the arm. By using this kind of oscillating type open/close valve, it is possible to switch-over to the independent path-state for each of the branch pipes when the open/close valve is closed easier than with a butterfly valve or slide valve, for example.

The meritorious effects of the present invention are summarized as follows.

According to the first and second aspects of the present invention, the exhaust gas flow from each of the branch pipes through the bypass path is streamlined when the open/close valve is completely closed, and it is possible to reduce exhaust interference and loss of exhaust heat.

According to the third aspect of the present invention, it is possible to contribute to the compactness of the collection section.

According to the fourth aspect of the present invention, together with making it possible to easily mount the branch pipes, makes it possible to easily switch-over to the independent path-state for each of the branch pipes when the open/close valve is closed.

According to the fifth aspect of the present invention, it is possible to easily and surely mount the branch pipes in the pipe-mounting member.

According to the sixth aspect of the present invention, it is possible to easily switch-over to the independent path-state for each of the branch pipes when the open/close valve is closed.

PREFERRED EMBODIMENTS OF THE INVENTION

A detailed embodiment of the invention will be explained in accordance to the drawings. This embodiment of the invention is an exhaust manifold that is applied to a 4-cylinder engine, by way of one example.

Figure 1:
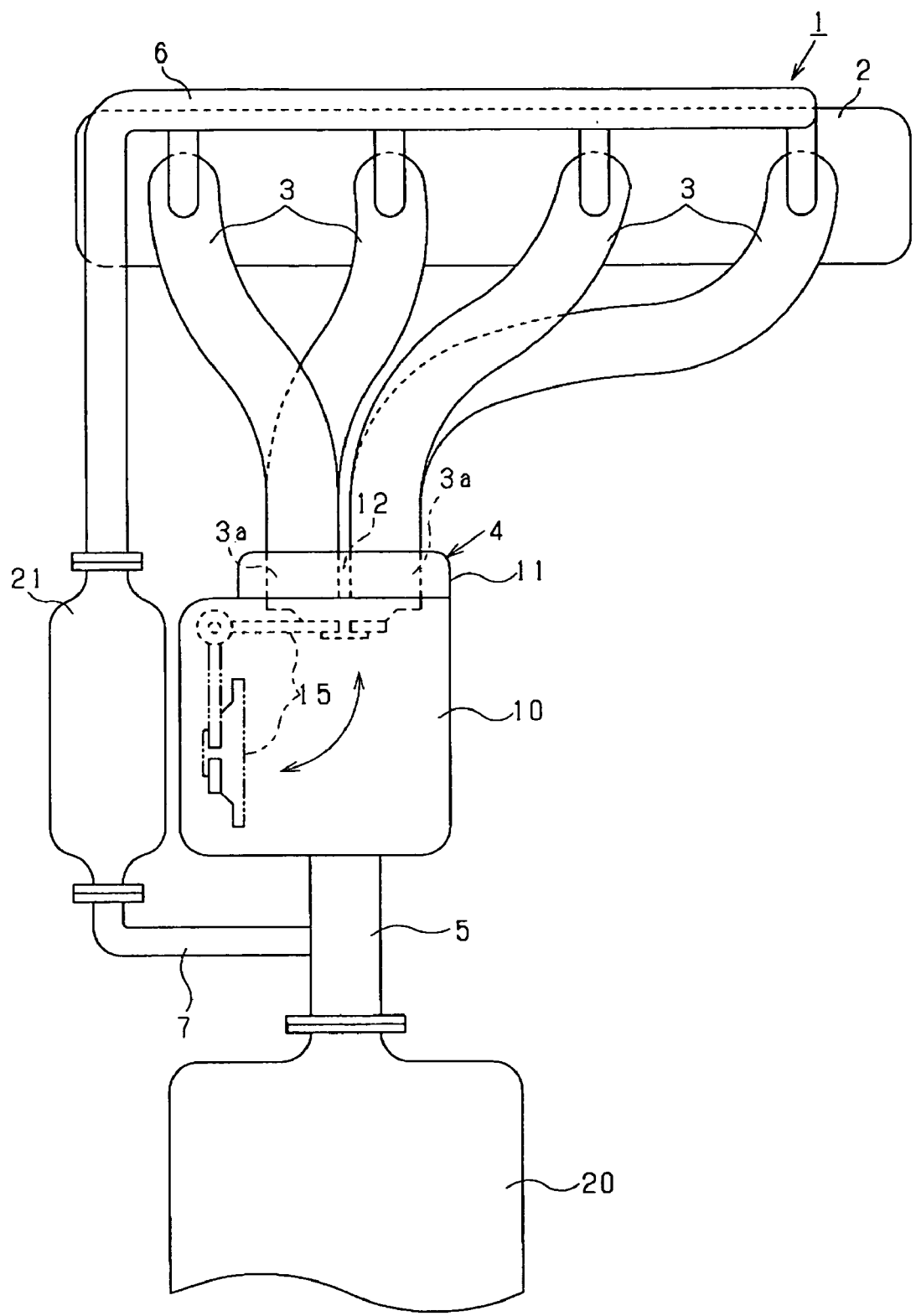
FIG. 1 is a front view of the exhaust manifold of an embodiment of the invention.

As shown in FIG. 1, the exhaust manifold 1 of this embodiment comprises; a head flange 2, four branch pipes 3, a collection section 4, a main-exhaust pipe 5 and bypass pipes 6, 7.

The head flange 2 is a horizontally long plate made of steel having four circular-shaped openings (not shown in the figure) that correspond to the exhaust ports of each of the cylinders, and it is fastened to the engine by way of a gasket (both are not shown in the figure). The end sections on the upstream side of the branch pipes 3 are connected to the edge sections formed around the circumference of each of the openings of the head flange 2, e.g., by welding. Each of the branch pipes 3 is made of stainless steel circular pipe and bent into a specified shape (bent such that the pipe length from the exhaust port in each cylinder to the collection section 4 of each respective pipe is as same as possible). The branch pipes 3 are collected into one at the collection section 4 on the downstream side.

Figure 2:
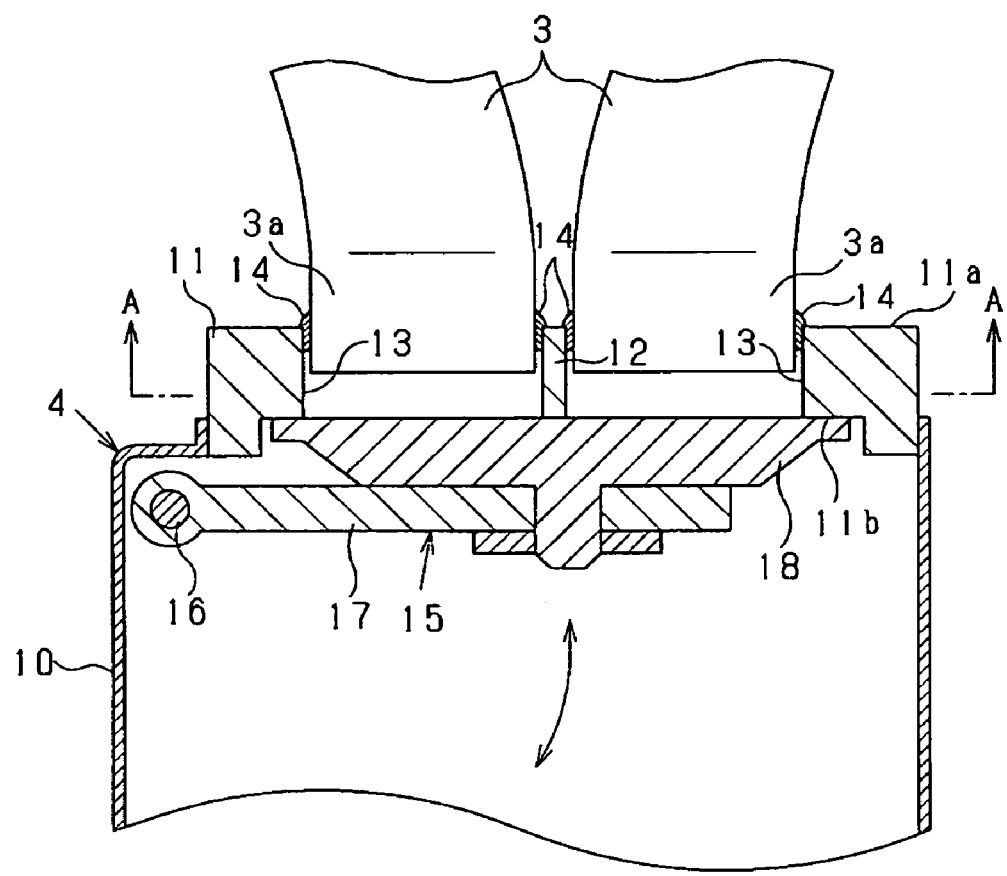
FIG. 2 is a cross-sectional view showing the upstream side of the collection section.
Figure 3:
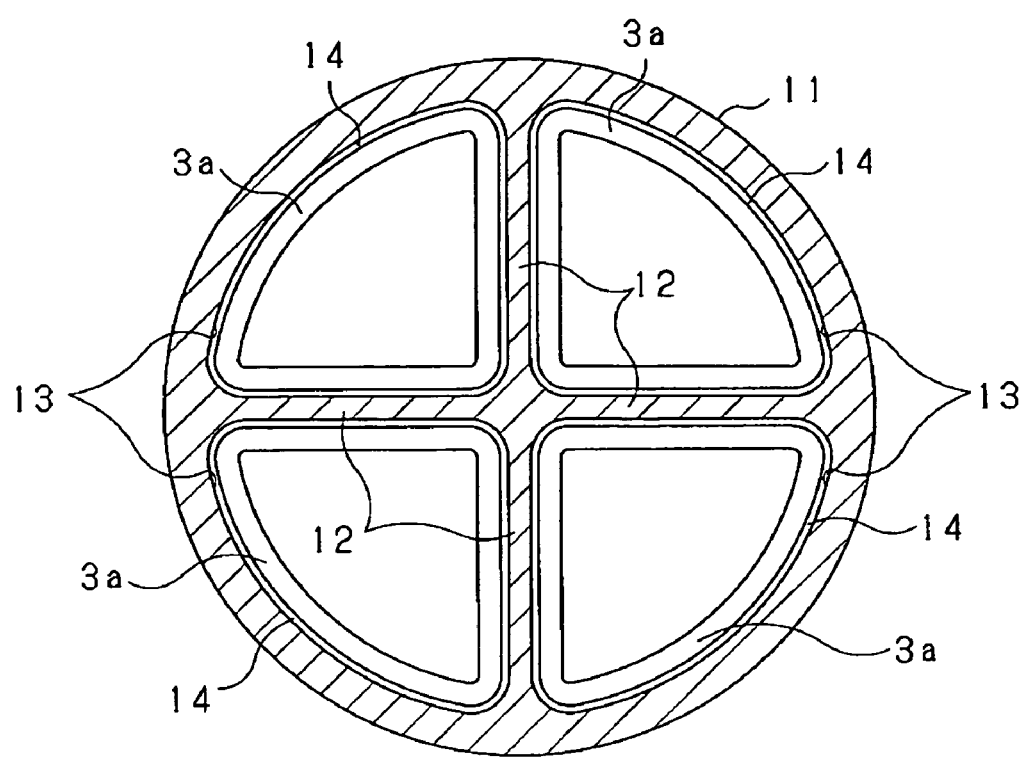
FIG. 3 is a cross-sectional view of section A-A in FIG. 2.

As shown in FIG. 2, the collection section 4 has a stainless steel housing 10, and an annular pipe-mounting member 11 similarly made of stainless steel is fastened to the upstream section of that housing 10. As shown in FIG. 3 the pipe-mounting member 11 has a circular external shape, and the circular cross-sectional space on the inside is divided into four spaces by a cross-shaped partition wall (partition wall structure) 12 to form portholes 13. Each of the portholes 13 has a fan-shaped cross-sectional shape with a 90° center angle, and is arranged with equal angular spacing. Also, the partition wall 12 axially extends from the end surface 11a on the upstream side of the pipe-mounting member 11 to the end surface 11b on the downstream side, while the partition wall with its radial wall sections radially extents from the crossed center to the annular inner surface of the pipe-mounting member 11 so as to make up a unison body.

Here, insert sections 3a that are deformed from a circular shape into an external shape (fan shape) that corresponds to the cross-sectional shape of the portholes 13 are formed on the end sections on the downstream side of the branch pipes 3. Also, the insert sections 3a of the branch pipes 3 are inserted from the upstream side of the portholes 13 into the pipe-mounting member 11, and connected joint sections 14 are formed all the way around the circumference between the outer surface of the insert sections 3a and the inner-wall surfaces that form the portholes 13, e.g., by welding.

In the housing 10 there is an open/close valve 15 located on the downstream side (side opposite the branch pipes 3) of the pipe-mounting member 11. The open/close valve 15 comprises a rotating shaft (pivot) 16 that is rotatable by an externally installed actuator (not shown in the figures), an arm 17 whose base-end section is attached to the rotating shaft 16, and a valve disc 18 that is mounted on the tip-end section of the arm 17. This valve disc 18 is formed into a disc shape with a size large enough to cover all of the portholes 13. When the actuator rotates the rotating shaft 16, the arm 17 rocks with that rotation and the valve disc 18 comes in contact with the end surface 11b on the downstream side of the pipe-mounting member 11 (in this case it comes in contact with the end surface on the downstream side of the partition wall 12) and the open/close valve 15 closes all of the portholes 13, or the valve disc 18 separates from the end surface 11b on the downstream side of the pipe-mounting member 11 and the open/close valve 15 opens all of the portholes 13.

A main-exhaust pipe 5 is connected to the downstream side of the collection section 4, and the space inside of the housing 10 communicates to the main-exhaust pipe 5. A main catalyst (downstream or rear catalyst) 20 that performs purification of the exhaust gas is located on the downstream side of the main-exhaust pipe 5.

Also, the bypass pipe 7 on the downstream side is connected to the middle of the main-exhaust pipe 5, and the main-exhaust pipe 5 communicates with the bypass pipe 7. Moreover, the bypass pipe 6 on the upstream side is connected to specified locations on the upstream side of the branch pipes 3, and the branch pipes 3 are continuous with the bypass pipe 6. Incidentally, the path cross-sectional area of the bypass pipe 6 is less than the path cross-sectional area of each of the branch pipes 3. A pre-catalyst (upstream or front catalyst) 21 is installed between these bypass pipes 6, 7. The pre-catalyst 21 is constructed such that its thermal capacity is well smaller than the aforementioned main catalyst 20 in order to speed up the temperature rise, so it is used mainly during cold starting of the engine.

In this embodiment, a temperature sensor (not shown in the figures) is installed in the main catalyst 20, and when that temperature sensor detects that the main catalyst 20 has not yet reached the suitable catalyst activation temperature, the open/close valve 15 is in the closed state. Therefore, the exhaust gas that is discharged from the engine's exhaust port flows to the main catalyst 20 by way of the bypass pipe 6, pre-catalyst 21, bypass pipe 7 and main-exhaust pipe 5. The temperature rise of the pre-catalyst 21 is fast, so purification of the exhaust gas can be performed well by the pre-catalyst 21 beginning from a comparatively early stage.

Also, when the open/close valve has closed off the portholes 13, the downstream side of the branch pipes 3 are blocked by the partition wall structure 12 so that they are no more continuous inside the collection section 4, so the flow of air is prevented in this area. By doing this, the exhaust interference does not occur in other cylinders due to exhaust pulsation in the area of the collection section 4, so a drop in the engine performance is suppressed. Also, air flow from the downstream side of the bypass pipe 6 in each of the branch pipes 3 to the open/close valve is reduced, so it is not necessary to actively warm all of the air in this space, and thus it is possible to keep loss due to exhaust heat of the exhaust gas to a minimum. Therefore, the exhaust gas can be supplied to the pre-catalyst 21 without much decrease in the heat capacity of the exhaust gas.

When the temperature sensor finally detects that the main catalyst 20 has reached a suitable catalyst activation temperature, the open/close valve 15 switches-over from the closed state to the open state. Therefore, the exhaust gas that is discharged from the engine's exhaust port begins to flow from each of the branch pipes 3 to the main catalyst 20 by way of the collection section 4 and main-exhaust pipe 5. In other words, when the main catalyst 20 reaches a suitable activation temperature, it is no longer necessary to use the pre-catalyst 21 that has a large exhaust resistance, so the open/close valve 15 opens and is switched such that the exhaust resistance is decreased.

With the embodiment described in detail above, the following outstanding effects are obtained.

In this embodiment, when the open/close value 15 is closed during a cold start so that the exhaust gas is led to the pre-catalyst 21, by having a partition wall 12 in the pipe-mounting member 11, the exhaust paths for each of the branch pipes 3 on the upstream side of the open/close valve 15 inside the collections section 4 are independent paths. Therefore, since the downstream sides of each of the branch pipes 3 are not continuous inside the collection section 4, the flow of air in this area is prevented. By doing this, when the open/close valve 15 is closed, exhaust interference in other cylinders due to exhaust pulsation in the collection section 4 does not occur, so it is possible to suppress a drop in engine performance. Also, since the airflow in the branch pipes from the downstream side of the bypass pipe 6 to the open/close valve 15 becomes low, it is not necessary to positively warm all of the air in this space, and thus it is possible to keep the loss of exhaust heat of the exhaust gas to a minimum. Therefore, it is possible to perform early warming of the pre-catalyst 21.

In this embodiment, the external shape of at least the portion of the collection section 4 that collects the branch pipes 3 together, or in other words, the external shape of the pipe-mounting member 11 is a circular (annular) shape, and the cross-sectional shape of the portholes 13, which are the exhaust paths for each of the branch pipes 3 inside the collection section 4, are fan shaped spaced at an angle of 90 that corresponds to the number (four in this case) of branch pipes 3 collected. In other words, it is possible to utilize as much cross-sectional area as possible for the exhaust paths of each of the branch pipes 3 inside the collection section 4, and to make as small as possible the exterior of the pipe-mounting member 11 that collects together all of the branch pipes 3 inside the collection section 4, and thus this embodiment is able to contribute to making the collection section 4 more compact.

This embodiment comprises a pipe-mounting member 11 that has portholes 13 that correspond to each of the branch pipes 3 and that are separated by the partition wall structure 12, and the insert sections 3a located on the end sections on the downstream side of the branch pipes 3 are inserted and mounted into the respective portholes 13. The portholes 13 in the pipe-mounting member 11 on the side opposite from the branch pipes 3 (end surfaces 11b on the downstream side) are opened or closed by the open/close valve 15. In other words, by simply using this kind of pipe-mounting member 11, it is easy to mount the branch pipes 3, and it is possible to easily switch-over to the independent path-state for each of the branch pipes 3 when the open/close valve is closed.

In this embodiment, the exterior shape of the insert sections 3a of the branch pipes 3 is deformed to match the shape of the portholes 13 of the pipe-mounting member 11, making insertion possible. Therefore, it is possible to reduce the gap between the inner partition surfaces that form the portholes 13 and the branch pipes 3, and thus it is possible to easily and surely mount the branch pipes 3 in the pipe-mounting member 11.

In this embodiment, by rotating the base-end section of the arm 17, the valve disc 18 on the tip-end section of that arm 17 functions as the open/close valve 15 that closes or opens the exhaust path inside the collection section 4. By using this kind of oscillating-type open/close valve 15, it is possible to switch-over to the independent path-state for each branch pipe 3 when the open/close valve 15 is closed easier than with a butterfly valve or sliding valve.

In this embodiment, the valve disc 18 of the open/close valve 15 has a circular disc shape, and since it is constructed such that it can come in contact with the end surface 11b on the downstream side of the pipe-mounting member 11, it is capable of improving the seal of the exhaust gas when compared with the butterfly valve that is used inside the exhaust path as disclosed in the example of prior art (Document 1).

The exhaust manifold 1 of this embodiment differs from the exhaust manifold disclosed in the example of prior art (Document 1) in that even when the open/close valve 15 is open, the exhaust gas that is discharged from the exhaust port of each cylinder is independently led to the collection section 4 by the branch pipes 3, so it is difficult for exhaust interference to occur, and thus it is possible to suppress a drop in engine performance.

This invention is not limited to the contents of the embodiment described above, and can also be embodied as described below for example.

In the embodiment described above, branch pipes 3 were installed and a pipe-mounting member 11 is used that comes in contact with or separates from an open/close valve that opens or closes the downstream side of each of the branch pipes 3, however, it is also possible to have the open/close valve 15 come in direct contact with or separate from the end surfaces on the downstream side of each of the branch pipes 3. In that case, it is possible to omit the pipe-mounting member 11.

In the embodiment described above, the portholes 13 of the pipe-mounting member 11 were fan shaped, however, the shape is not limited to this, for example, the end sections (insert sections 3a) on the downstream side of the branch pipes 3 could be kept as a cylindrical shape, and the portholes 13 of the pipe-mounting member 11 could be made into a circular shape that matches the branch pipes 3. By doing this, it is possible to do away with the need to process the insert sections 3a of the branch pipes 3.

The embodiment described above was applied to a 4-cylinder engine, however, in addition to a 4-cylinder engine, it can also be applied to other multi-cylinder engines. For example, in the case of applying the embodiment to a 6-cylinder engine, the number of branch pipes 3 increases to six. In this case, there is the form of collecting six branch pipes 3 in one collection section 4, or the form of grouping three branch pipes 3 into one group, and then having a collection section 4 for each group. In the first form, it is preferred that the portholes 13 of the pipe-mounting member 11 be fan shaped and spaced at a 60° center angle. In the latter form, it is preferred that the portholes 13 of the pipe-mounting member 11 be fan shaped and spaced at a 120° center angle. In other words, the portholes 13 of the pipe-mounting member 11 are fan shaped and spaced at a center angle that corresponds with the number of collected branch pipes.

In the embodiment described above, the arm 17 and the valve disc 18 of the open/close valve 15 were separate and were constructed such that the valve disc 18 was attached to the arm 17, however, it is also possible to form the arm 17 and valve disc 18 into a single member. Also, one valve disc 18 was used, and that valve disc 18 was formed such that it was capable of closing all portholes 13, however, it is also possible to have a corresponding valve disc 18 for each respective port hole 13, for example. Moreover, this open/close valve 15 was an oscillating type open/close valve, however, it is also possible to use another kind of open/close valve such as a butterfly valve or slide valve.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An exhaust manifold comprising:
   branch pipes that correspond to each cylinder of a multi-cylinder internal-combustion engine;
   a collection section that collects together end sections on the downstream side of said branch pipes and leads them to a downstream catalyst;
   a bypass path for joining the upstream side of said collection section with the downstream side of said collection section, and causes an upstream catalyst to intervene midstream; and
   an open/close valve that closes the exhaust path inside said collection section and leads an exhaust gas from an internal-combustion engine to the side of said upstream catalyst, while on the other hand, by opening that exhaust path, leads said exhaust gas to the side of said downstream catalyst; characterized in that
   when said open/close valve is closed, a path system is established such that exhaust paths for each of said collected branch pipes are independent from one another on the upstream side of said open/close valve inside said collection section.

2. An exhaust manifold comprising:
branch pipes that correspond to each cylinder of a multi-cylinder internal-combustion engine;
a collection section that collects together end sections on the downstream side of said branch pipes and leads them to a downstream catalyst;
a bypass path for joining the upstream side of said collection section with the downstream side of said collection section, and causes an upstream catalyst to intervene midstream; and
an open/close valve that closes the exhaust path inside said collection section and leads an exhaust gas from an internal-combustion engine to the side of said upstream catalyst, while on the other hand, by opening that exhaust path, leads said exhaust gas to the side of said downstream catalyst; wherein
said exhaust manifold further comprises a partition wall structure that separates the exhaust paths for each of said collected branch pipes on the upstream side of said open/close valve inside said collection section, when said open/close valve is closed.

3. The exhaust manifold of claim 1, characterized in that
the external shape of at least a portion of said collection section that collects said branch pipes is circular shaped; and
the cross-sectional shape of the exhaust paths for each of the branch pipes inside said collection section is fan shaped and spaced by a uniform angle that corresponds to the number of branch pipes that are collected.

4. The exhaust manifold of claim 2, characterized in that
the external shape of at least a portion of said collection section that collects said branch pipes is circular shaped; and
the cross-sectional shape of the exhaust paths for each of the branch pipes inside said collection section is fan shaped and spaced by a uniform angle that corresponds to the number of branch pipes that are collected.

5. The exhaust manifold of claim 1, characterized in that said collection section comprises a pipe-mounting member that has portholes corresponding to each of said branch pipes such that the end sections on the downstream side of each of said collected branch pipes are inserted and mounted in said respective portholes, and each of the portholes on the side opposite said branch pipes is opened or closed by said open/close valve.

6. The exhaust manifold of claim 2, characterized in that said collection section comprises a pipe-mounting member that has portholes corresponding to each of said branch pipes such that the end sections on the downstream side of each of said collected branch pipes are inserted and mounted in said respective portholes, and each of the portholes on the side opposite said branch pipes is opened or closed by said open/close valve.

7. The exhaust manifold of claim 3, characterized in that said collection section comprises a pipe-mounting member that has portholes corresponding to each of said branch pipes such that the end sections on the downstream side of each of said collected branch pipes are inserted and mounted in said respective portholes, and each of the portholes on the side opposite said branch pipes is opened or closed by said open/close valve.

8. The exhaust manifold of claim 5, characterized in that when the external shape of the end sections on the downstream side of said branch pipes is different from the shape of said portholes, the external shape of the end sections on the downstream side of said branch pipes is deformed to match the shape of said portholes so as to be inserted into said portholes.

9. The exhaust manifold of claim 6, characterized in that when the external shape of the end sections on the downstream side of said branch pipes is different from the shape of said portholes, the external shape of the end sections on the downstream side of said branch pipes is deformed to match the shape of said portholes so as to be inserted into said portholes.

10. The exhaust manifold of claim 7, characterized in that when the external shape of the end sections on the downstream side of said branch pipes is different from the shape of said portholes, the external shape of the end sections on the downstream side of said branch pipes is deformed to match the shape of said portholes so as to be inserted into said portholes.

11. The exhaust manifold of claim 1, characterized in that said open/close valve has a valve disc located on a tip-end section of an arm that is capable of closing the exhaust path inside said collection section, and by rotatably pivoting the base-end section of the arm, closes or opens the exhaust path inside said collection section.

12. The exhaust manifold of claim 2, characterized in that said open/close valve has a valve disc located on a tip-end section of an arm that is capable of closing the exhaust path inside said collection section, and by rotatably pivoting the base-end section of the arm, closes or opens the exhaust path inside said collection section.

13. The exhaust manifold of claim 3, characterized in that said open/close valve has a valve disc located on a tip-end section of an arm that is capable of closing the exhaust path inside said collection section, and by rotatably pivoting the base-end section of the arm, closes or opens the exhaust path inside said collection section.

14. The exhaust manifold of claim 4, characterized in that said open/close valve has a valve disc located on a tip-end section of an arm that is capable of closing the exhaust path inside said collection section, and by rotatably pivoting the base-end section of the arm, closes or opens the exhaust path inside said collection section.

15. The exhaust manifold of claim 5, characterized in that said open/close valve has a valve disc located on a tip-end section of an arm that is capable of closing the exhaust path inside said collection section, and by rotatably pivoting the base-end section of the arm, closes or opens the exhaust path inside said collection section.

16. The exhaust manifold of claim 8, characterized in that said open/close valve has a valve disc located on a tip-end section of an arm that is capable of closing the exhaust path inside said collection section, and by rotatably pivoting the base-end section of the arm, closes or opens the exhaust path inside said collection section.

* * * * *